Patented Sept. 10, 1929.

1,727,916

UNITED STATES PATENT OFFICE.

JOHN YOUNG, OF MONTCLAIR, NEW JERSEY, ASSIGNOR TO NATIONAL ANILINE & CHEMICAL COMPANY, INC., OF NEW YORK, N. Y., A CORPORATION OF NEW YORK.

METHOD OF MAKING DITOLYLGUANIDINE.

No Drawing. Application filed December 3, 1923. Serial No. 678,157.

This invention relates to the manufacture and production of ditolylguanidine, and particularly diorthotolylguanidine.

It is known that diphenylguanidine hydrochloride has been prepared by passing gaseous cyanogen chloride into aniline, the reaction-mass being kept in a molten condition by the external application of heat until no further absorption of gas takes place (Hofmann, Ann., 67, 130–132 (1848); Weith and Schroeder, Ber. 7, 939–940 (1874). On the other hand Wilson (Ann., 77, 218 (1851)) found difficulty in applying this method to the preparation of ditolylguanidine hydrochloride, which he called metoluidine hydrochloride, and due to the further changes which the hydrochloride seemed to undergo upon the application of heat, he resorted to a method of exposing the surface of thin layers of the toluidine to the action of the gas. Wilson's process apparently had to do with the preparation of diparatolylguanidine hydrochloride (see Perkin, Jour. Chem. Soc., 37, 696 (1880)), and, so far as I am aware, diorthotolylguanidine or its hydrochloride has never been prepared by the action of cyanogen chloride or orthotoluidine.

According to the present invention, I have found that by appropriate adjustment of the conditions under which the reaction is carried out, diorthotolylguanidine hydrochloride and diparatolylguanidine hydrochloride, either alone or in mixtures, can be readily and expeditiously produced without the formation of significant amounts, if any, of the undesirable by-products suggested by Wilson as mentioned above. From the hydrochlorides thus produced, the corresponding bases may be obtained in any suitable manner.

In the practice of the present invention, cyanogen chloride which is substantially free from water, uncombined chlorine and hydrogen chloride and obtainable from any suitable source, and preferably in the gaseous state, is passed or introduced directly into or through well-stirred and substantially dry toluidine maintained at temperatures sufficiently high to keep the reaction-mixture in a fluid or semi-fluid condition but avoiding temperatures sufficiently high to effect undesirable changes and the production of undesirable by-products.

The invention will be further illustrated by the following specific example, but it will be understood that the invention is not limited thereto.

Example: Cyanogen chloride, in the gaseous state and substantially free from water, uncombined chlorine and hydrogen chloride, is passed into dry and well-stirred orthotoluidine, which is at an initial temperature of from about 60° or 70° to 90° C. and contained in three vessels arranged in series, the vessels being equipped with means for heating or cooling the contents thereof.

The cyanogen chloride is rapidly absorbed with formation of diorthotolylguanidine hydrochloride. Since the reaction is exothermic, the temperature of the mixture tends to rise above the initial temperature, particularly while the absorption is rapid. As the reaction proceeds and the mass becomes more and more viscous, the temperature is raised, either by the heat of reaction or by the careful application of external heat, to about 90°–110° C. and is maintained with vigorous stirring at this temperature until the reaction is substantially complete. Since high temperatures produce further changes and give rise to undesirable by-products, it is essential that the temperature of the reaction-mass be carefully regulated and controlled, by means of external cooling if necessary, and for the best results the temperature should not be allowed to exceed about 120°–130° C., and preferably around 90° C. to 110° C. should be employed.

As the cyanogen chloride is absorbed, the contents of the first vessel become more and more viscous, the rate of absorption of the cyanogen chloride gradually lessens, and cyanogen chloride finally passes through unabsorbed into the orthotoluidine contained in the second vessel where a set of reactions takes place similar to those observed in the first vessel. When practically no cyanogen chloride is further absorbed by the contents of the first vessel, the addition of cyanogen chloride is discontinued and the vessel disconnected from the series. A new vessel containing orthotoluidine is attached as the third member to the end of the remaining vessels and the process of passing cyanogen chloride through the series is continued as before. In this way, the process is a semi-continuous one; but it can be made into a continuous process in any suitable manner, for example, by employing two different sets of series so that the cyanogen chloride is being passed through one set while the diorthotolylguanidine or its hydrochloride is being recovered from the other.

The contents of the first vessel, which consist mostly, if not entirely, of diorthotolylguanidine hydrochloride, are dissolved in hot water and the solution filtered from small amounts of insoluble impurities sometimes present. The filtrate is then poured into a slight excess of a well-stirred caustic soda solution and the precipitated diorthotolylguanidine thus obtained is immediately filtered off, thoroughly washed with water, freed from excess water in a centrifugal machine, dried in a current of air at about 80° to 90° C., and ground to a fine powder. If desired, the product may be further purified by any suitable means, for example, by recrystallization from alcohol.

As thus produced, diorthotolylguanidine is substantially free from resinous and tarlike impurities, and the yields are excellent.

It may be pointed out that the cyanogen chloride can be introduced initially into orthotoluidine at ordinary temperatures, for example, at about 20°–25° C., or at a temperature between these temperatures and about 90° C., and subsequently the temperature raised to the desired point best not exceeding about 120°–130° C. and preferably around 90°–110° C. as mentioned above as the reaction proceeds and the mass becomes viscous.

It may be further pointed out that in carrying out the invention, the toluidine, for the best results, should be kept vigorously stirred or agitated throughout the process in order not only to assist in the complete absorption of the cyanogen chloride but also to prevent local over-heating from the exothermic reaction or by the application of external heat. Further, cyanogen bromide may be used in place of cyanogen chloride.

In a similar or analogous manner, diparatolylguanidine and dimetatolylguanidine can be prepared respectively from paratoluidine and metatoluidine. Further, a mixed or mixture of ditolylguanidines can be prepared by employing a mixture of toluidines, for example, the mixture produced by reduction of mixed nitrotoluenes. Thus, the so-called "low para cuts" can be used which are obtained in conjunction with the manufacture of para-nitrotoluene, and which are composed of a mixture consisting chiefly of orthonitrotoluene (about 85 to 95 percent) and para-nitrotoluene (about 3 to 15 percent), together with small amounts of meta-nitrotoluene and possibly other nitro-bodies. Upon reducing this mixture, there is produced a mixture of the corresponding amino-bodies, chiefly aminotoluenes, which can be used in making the mixed or mixture of corresponding disubstituted guanidines according to the present invention and in the manner above described.

Instead of employing gaseous cyanogen chloride, toluidine may be subjected to the action of liquid cyanogen chloride for the production of ditolylguanidine hydrochloride at a temperature of 90°–110° C. It will thus be seen that the present invention permits the production of ditolylguanidine, particularly, diorthotolylguanidine, or mixed ditolylguanidines from the mixture of toluidines obtained by the reduction of "low para cuts", which are mixtures consisting chiefly of ortho-nitrotoluene (about 85 to 95%) and para-nitrotoluene (about 3 to 15%) together with small amounts of meta-nitrotoluene and possibly other nitro bodies without the simultaneous production of large quantities of resinous or tarlike impurities, or other undesirable by-products. Further, the invention produces excellent yields of products of high purity, and the process permits of easy control and may be readily and economically operated either as a semi-continuous or a continuous process.

In the claims, it will be understood that the term "halide" includes chloride (chlorine has an atomic number of 17) and bromide (bromine has an atomic number of 35), that the term "hydrogen halide" includes hydrogen chloride and hydrogen bromide, and that the term "toluidine" includes orthotoluidine, metatoluidine and paratoluidine.

I claim:

1. The method of making diorthotolylguanidine hydrohalide, which comprises subjecting orthotoluidine at a temperature of more than about 60° C. and not substantially exceeding 130° C. to the action of cyanogen halide in which the halogen has an atomic number between 17 and 35 inclusive.

2. The method of making diorthotolylguanidine hydrochloride, which comprises subjecting orthotoluidine at a temperature of more than about 60° C. and not substantially exceeding 130° C. to the action of cyanogen chloride.

3. In the method of producing ditolylguanidine halide by subjecting toluidine to the action of cyanogen halide in which the halogen has an atomic number between 17 and 35 inclusive, the step characterized by causing the reaction to occur at a temperature of from about 90° C. to 110° C.

4. The method of making ditolylguanidine halide, which comprises gradually introducing cyanogen halide in which the halogen has an atomic number between 17 and 35 inclusive into and through well-stirred toluidine at an initial temperature of from about 60° to 90° C., subsequently raising the temperature, as the reaction-mass becomes viscous, to about 90°–110° C., and maintaining this temperature until the toluidine is substantially saturated with cyanogen halide.

5. The method of making ditolylguanidine hydrochloride, which comprises subjecting toluidine to the action of gaseous cyanogen chloride by introducing gaseous cyanogen chloride into and through well-stirred toluidine maintained at a temperature of about 90°–110° C.

6. The method of making diorthotolylguanidine hydrochloride, which comprises subjecting orthotoluidine to the action of cyanogen chloride at a temperature of 90°–110° C.

7. The method of making diorthotolylguanidine hydrochloride, which comprises bringing orthotoluidine into intimate contact with gaseous cyanogen chloride at a temperature of about 90°–110° C.

8. The method of making diorthotolylguanidine hydrochloride, which comprises passing gaseous cyanogen chloride into and through well-stirred orthotoluidine at an initial temperature of from about 20° to 90° C., subsequently raising the temperature, as the reaction-mass becomes viscous, to about 90°–110° C., and maintaining this temperature until the toluidine absorbs substantially no more cyanogen chloride.

9. In the process of making diorthotolylguanidine hydrochloride by subjecting orthotoluidine to the action of cyanogen chloride, the steps characterized by introducing the cyanogen chloride into and through well-stirred orthotoluidine maintained at a temperature of about 90°–110° C.

10. In the method of producing diorthotolylguanidine by the action of cyanogen chloride on orthotoluidine at a temperature of about 90°–110° C., the step of keeping the orthotoluidine well agitated during the reaction.

11. The method of making a mixture of ditolylguanidine hydrochlorides, which comprises subjecting the mixture of aminotoluenes obtained by reducing so-called "low para cuts" to the action of cyanogen chloride.

12. The method of making diorthotolylguanidine hydrohalide which comprises gradually introducing cyanogen halide in which the halogen has an atomic number between 17 and 35 inclusive into and through well-stirred orthotoluidine at an initial temperature of from about 60° to 90° C., subsequently raising the temperature as the reaction-mass becomes viscous to a temperature not substantially exceeding 130° C., and maintaining this temperature until the toluidine is substantially saturated with cyanogen halide.

13. The method of making diorthotolylguanidine hydrochloride, which comprises passing gaseous cyanogen chloride into and through well-stirred orthotoluidine at an initial temperature of from about 20°–90° C., subsequently raising the temperature as the reaction-mass becomes viscous to a temperature not substantially exceeding 130° C., and maintaining this temperature until the toluidine absorbs substantially no more cyanogen chloride.

14. The method of making ditolylguanidine hydrochloride which comprises bringing cyanogen chloride into intimate contact with well-stirred toluidine at about 90°–110° C.

15. The method of making diorthotolylguanidine hydrochloride which comprises passing gaseous cyanogen chloride into and through well-stirred orthotoluidine at about 90°–110° C.

16. The method of making ditolylguanidine, which comprises treating toluidine with cyanogen halide in which the halogen has an atomic number between 17 and 35 inclusive at about 90°–110° C., dissolving the product thus obtained in water, and adding the solution thus obtained to an aqueous solution containing caustic alkali to precipitate the ditolylguanidine, and separating the precipitate of ditolylguanidine thus produced.

17. The method of making a mixture of ditolylguanidine hydrohalides which comprises subjecting a mixture of aminotoluenes to the action of cyanogen halide in which the halogen has an atomic number between 17 and 35 inclusive.

18. In the method of producing ditolylguanidine by the action of cyanogen halide in which the halogen has an atomic number between 17 and 35 inclusive on toluidine at about 90°–110° C., the step of keeping the toluidine well agitated during the reaction.

19. In the method of making a diorthotolylguanidine by the action of cyanogen halide in which the halogen has an atomic number between 17 and 35 inclusive on orthotoluidine, the step of keeping the orthotoluidine well agitated during the reaction.

20. The method of making a mixture of ditolylguanidine hydrohalides which comprises subjecting a mixture of aminotoluenes including orthotoluidine to the action of cyanogen halide in which the halogen has an atomic number between 17 and 35 inclusive at a temperature of about 90°–110° C.

21. The method of making diorthotolylguanidine hydrohalide, which comprises subjecting agitated orthotoluidine at a temperature of more than about 60° C. and not substantially exceeding 130° C. to the action of cyanogen halide in which the halogen has an atomic number between 17 and 35 inclusive.

22. The method of making diorthotolylguanidine hydrochloride which comprises subjecting agitated orthotoluidine at a temperature of more than about 60° C. and not substantially exceeding 130° C. to the action of cyanogen chloride.

23. In the method of producing ditolylguanidine hydrohalide by subjecting agitated toluidine to the action of cyanogen halide in which the halogen has an atomic number between 17 and 35 inclusive, the step characterized by causing the reaction to occur at a temperature of from about 90°–110° C.

24. The method of making diorthotolylguanidine hydrochloride, which comprises subjecting agitated orthotoluidine to the action of cyanogen chloride at a temperature of about 90°–110° C.

25. The method of making diorthotolylguanidine hydrochloride, which comprises bringing agitated orthotoluidine into intimate contact with gaseous cyanogen chloride at a temperature of about 90°–110° C.

26. The method of making ditolylguanidine, which comprises treating agitated toluidine with cyanogen halide in which the halogen has an atomic number between 17 and 35 inclusive at a temperature of about 90°–110° C., dissolving the product thus obtained in water, adding the solution thus obtained to an aqueous solution containing caustic alkali to precipitate the ditolylguanidine, and separating the precipitate of ditolylguanidine thus produced.

In testimony whereof I affix my signature.

JOHN YOUNG.

CERTIFICATE OF CORRECTION.

Patent No. 1,727,916.  Granted September 10, 1929, to

JOHN YOUNG.

It is hereby certified that error appears in the printed specification of the above numbered patent requiring correction as follows: Page 1, line 27, for the word "or" read "on"; page 2, lines 79 and 80, strike out the phrase "at a temperature of 90° - 110°C."; and the said Letters Patent should be read with these corrections therein that the same may conform to the record of the case in the Patent Office.

Signed and sealed this 29th day of October, A. D. 1929.

(Seal)

M. J. Moore,
Acting Commissioner of Patents.

guanidine hydrochloride which comprises subjecting agitated orthotoluidine at a temperature of more than about 60° C. and not substantially exceeding 130° C. to the action of cyanogen chloride.

23. In the method of producing ditolylguanidine hydrohalide by subjecting agitated toluidine to the action of cyanogen halide in which the halogen has an atomic number between 17 and 35 inclusive, the step characterized by causing the reaction to occur at a temperature of from about 90°–110° C.

24. The method of making diorthotolylguanidine hydrochloride, which comprises subjecting agitated orthotoluidine to the action of cyanogen chloride at a temperature of about 90°–110° C.

25. The method of making diorthotolylguanidine hydrochloride, which comprises bringing agitated orthotoluidine into intimate contact with gaseous cyanogen chloride at a temperature of about 90°–110° C.

26. The method of making ditolylguanidine, which comprises treating agitated toluidine with cyanogen halide in which the halogen has an atomic number between 17 and 35 inclusive at a temperature of about 90°–110° C., dissolving the product thus obtained in water, adding the solution thus obtained to an aqueous solution containing caustic alkali to precipitate the ditolylguanidine, and separating the precipitate of ditolylguanidine thus produced.

In testimony whereof I affix my signature.

JOHN YOUNG.

CERTIFICATE OF CORRECTION.

Patent No. 1,727,916.   Granted September 10, 1929, to

JOHN YOUNG.

It is hereby certified that error appears in the printed specification of the above numbered patent requiring correction as follows: Page 1, line 27, for the word "or" read "on"; page 2, lines 79 and 80, strike out the phrase "at a temperature of 90° - 110°C."; and the said Letters Patent should be read with these corrections therein that the same may conform to the record of the case in the Patent Office.

Signed and sealed this 29th day of October, A. D. 1929.

(Seal)

M. J. Moore,
Acting Commissioner of Patents.